May 19, 1970  A. POLICH, JR  3,512,837
SEMITRAILER DUMP BODY STRUCTURE
Filed Oct. 9, 1968  6 Sheets-Sheet 2

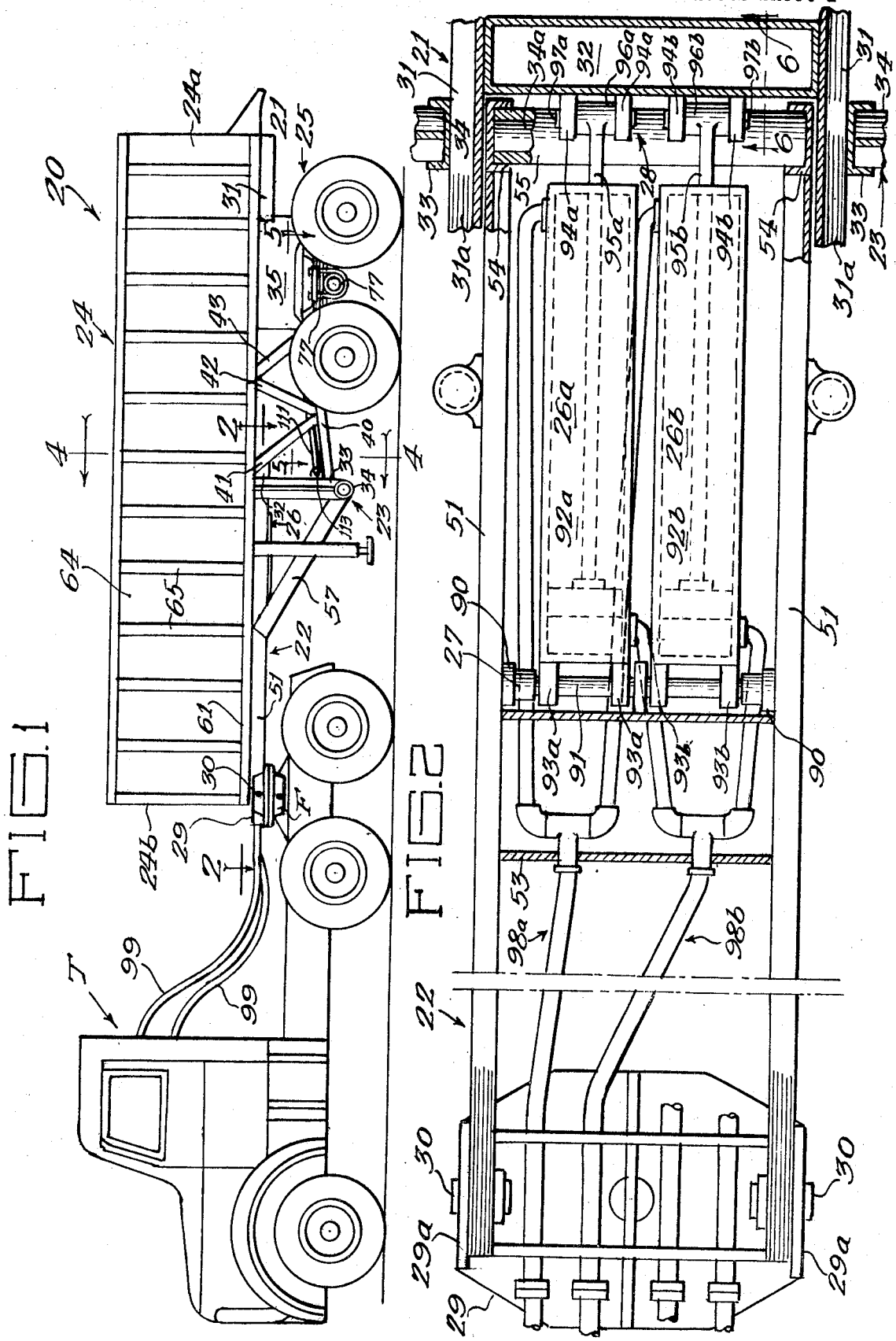

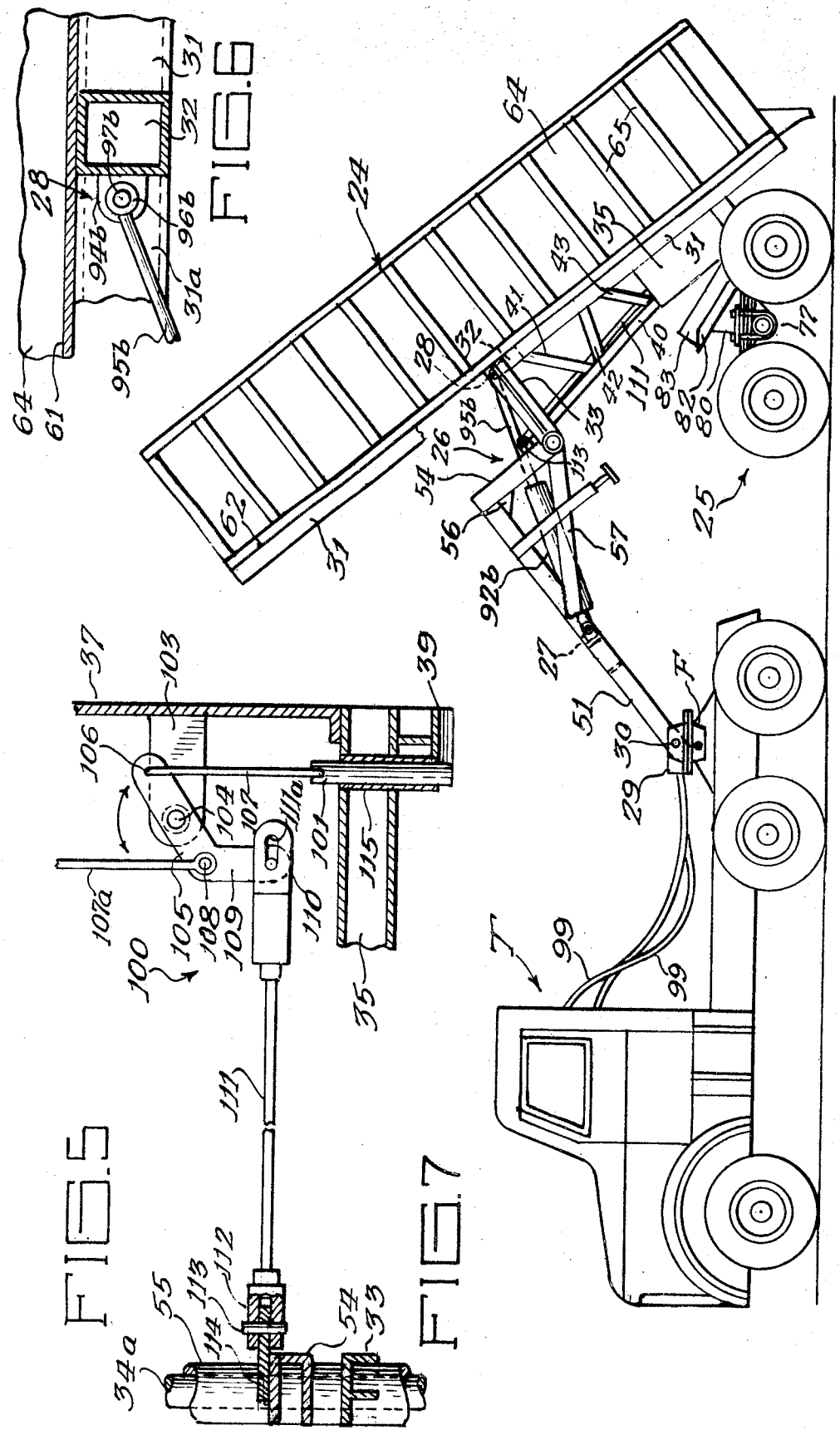

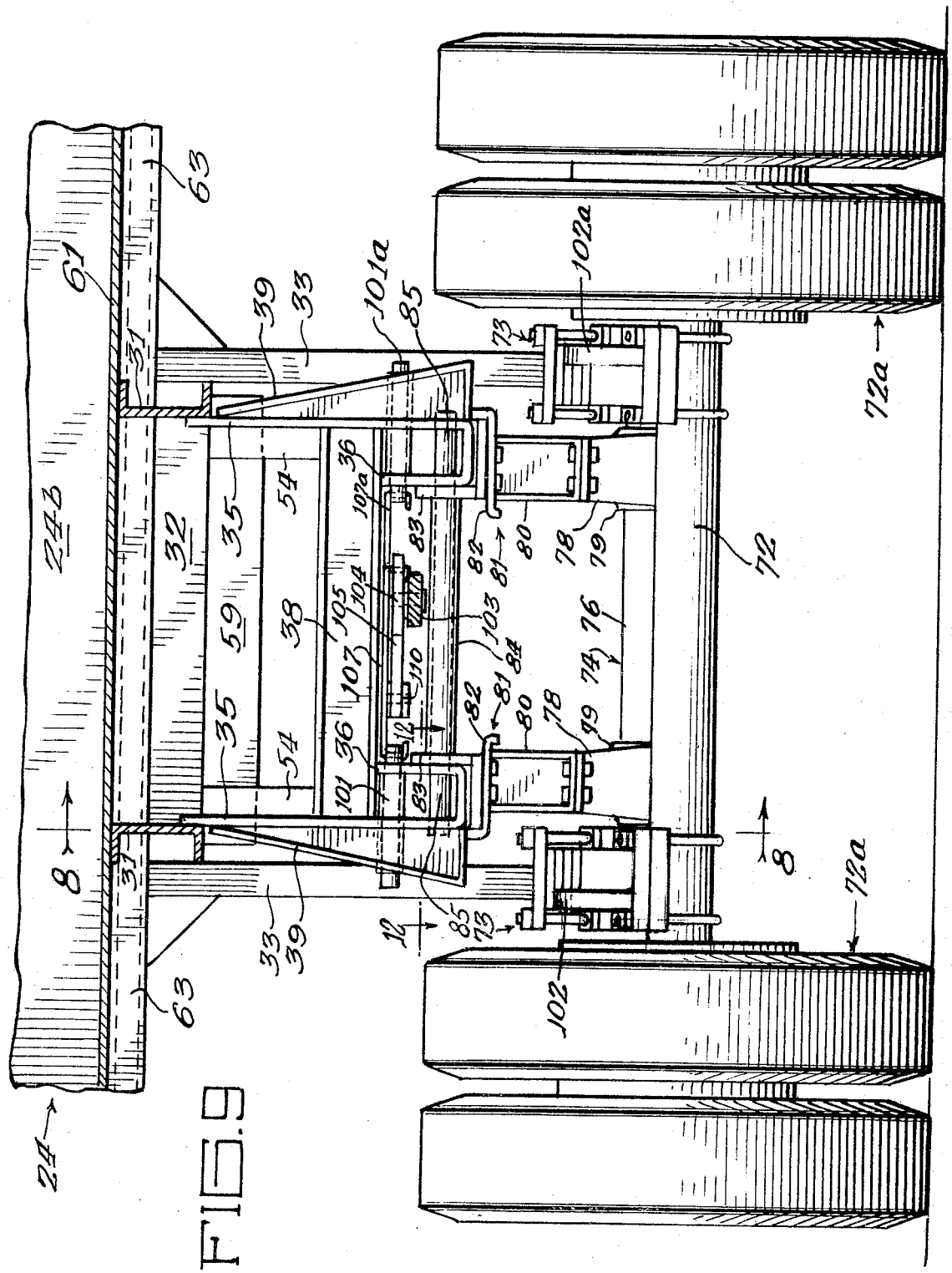

May 19, 1970  A. POLICH, JR  3,512,837
SEMITRAILER DUMP BODY STRUCTURE
Filed Oct. 9, 1968  6 Sheets-Sheet 5
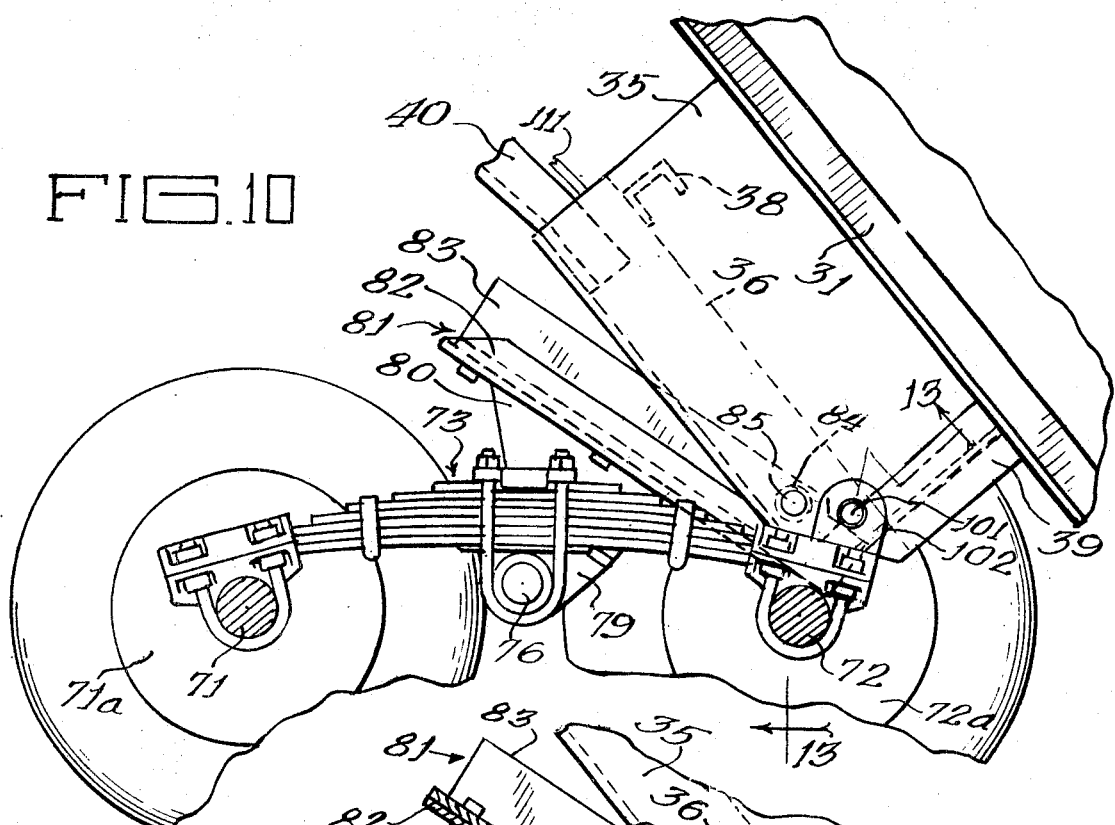
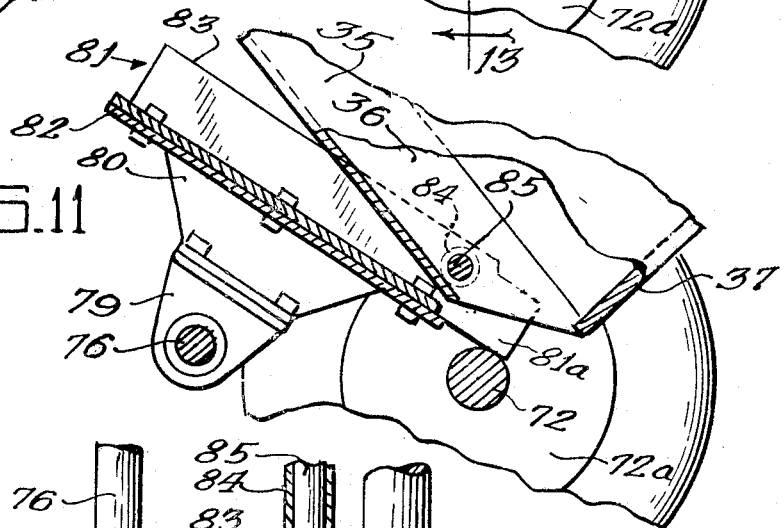
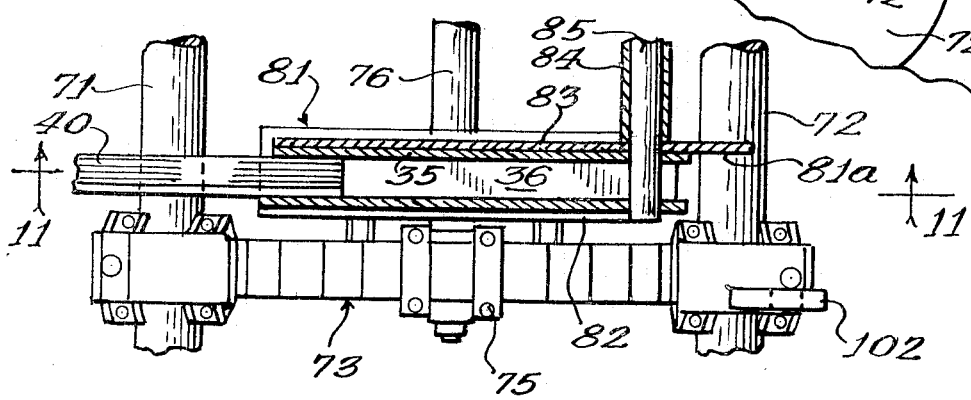

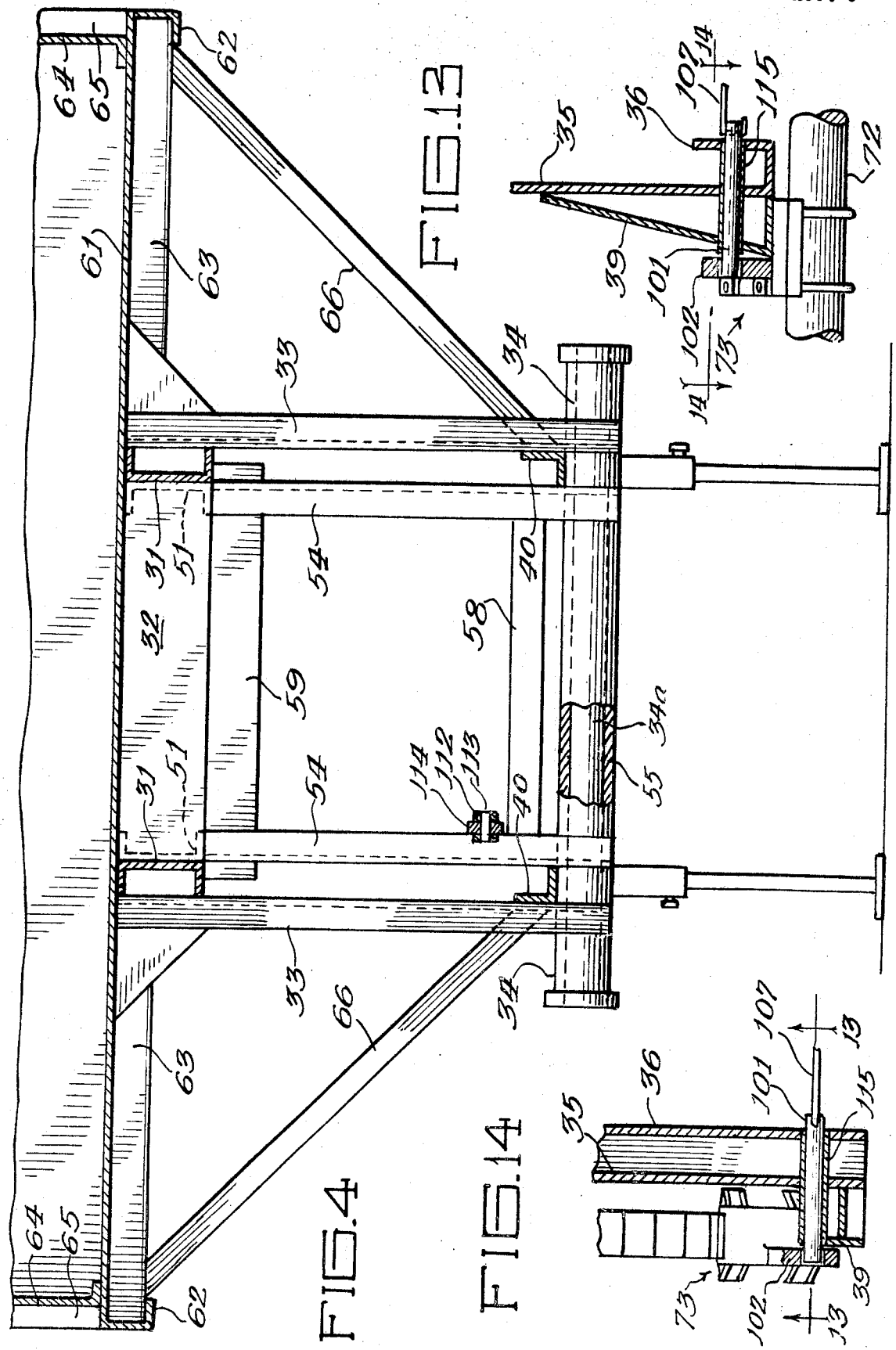

United States Patent Office 3,512,837
Patented May 19, 1970

3,512,837
SEMITRAILER DUMP BODY STRUCTURE
Anthony Polich, Jr., 8746 40th St.,
Lyons, Ill. 60534
Filed Oct. 9, 1968, Ser. No. 766,052
Int. Cl. B60p 1/18
U.S. Cl. 298—22      7 Claims

ABSTRACT OF THE DISCLOSURE

A semitrailer dump body construction in which a longitudinal main frame which has its rear end supported by a rear axle assembly and carries the dump vehicle, and a longitudinal forward frame the forward end of which is carried upon a transverse pivot on a fifth wheel of a tractor and which supports the forward portion of the dump body in a horizontal or travel position of the body, have their adjacent ends connected by a transverse main pivot which is located adjacent the midpoint between the front and rear ends of the dump body, and in which extensible means is pivotally connected to the two frames across the main pivot so that extension of the extensible means elevates the adjacent ends of the two frames and jackknifes them about the main pivot to move the main frame and dump body to an inclined dump position.

To permit the forward wheels of a tandem rear axle assembly to remain on the ground as the main frame and dump body move toward dump position, means are provided for pivotally mounting the rear of the main frame upon the tandem axle assembly.

CROSS REFERENCE TO RELATED APPLICATION

Means for laterally stabilizing the dump body in dump position, described in this application, is disclosed and claimed in my copending U.S. patent application Ser. No. 766,051 filed Oct. 9, 1968.

BACKGROUND OF THE INVENTION

Prior art semitrailer dump vehicle structures which elevate the front of the dump body to move the body to an inclined dump position have an open bottom housing within the front of the dump body which pivotally receives the upper end of a telescoping piston of a vertically mounted hydraulic cylinder and piston unit. The housing reduces the capacity of the dump body, and in order to balance the load between the rear axle assembly of the tractor and the rear axle assembly of the semitrailer the trailer axle assembly must be as far as possible toward the rear of the dump vehicle. This interferes with dumping. Furthermore, the telescoping piston units are relatively very expensive. Some types of semitrailer dump body structures use a vertically mounted solid piston unit, but these are capable of elevating the front of the dump body only to a relatively small angle so that such dump bodies may be used only with relatively free-flowing material.

Further, the prior art structures must have one end of the cylinder and piston unit mounted on the kingpin which connects the front of the dump vehicle to the fifth wheel of the tractor, because the cylinder and piston unit must turn with the semitrailer. This, of course, requires that the piston housing in the front of the dump body be above the fifth wheel in travel position, and limits the ability to extend the front of the body any substantial distance forward of the fifth wheel.

The present invention provides a semitrailer dump vehicle structure which eliminates the above enumerated structural and operating objections to the prior art devices.

SUMMARY OF THE INVENTION

In accordance with the present invention, a dump vehicle main frame has its rear end supported upon a rear axle assembly, while a forward frame has its front end connected through a transverse pivot to a kingpin which mounts on the fifth wheel of a tractor. The dump body is mounted upon the main frame with its front half supported by the forward frame when it is in its horizontal travel position. The adjacent ends of the two frames are connected by a transverse pivot, and a longitudinally disposed hydraulic cylinder and piston unit has its cylinder pivotally connected to the forward frame and its piston pivotally connected to the main frame across the main transverse pivot. Thus, extension of the piston rotates the adjacent ends of the two frames about the pivot to jackknife the frames relative to one another and thereby move the dump body to an inclined dump position.

The present semitrailer dump vehicle structure, therefore, eliminates the need for a space-wasting well in the front of the dump body, and can provide for a high lift of the dump body even with a relatively inexpensive solid piston type of cylinder and piston unit. It also eliminates the other previously mentioned disadvantages which are inherent in prior art structures having an upright cylinder and piston unit at the front.

In addition to the foregoing advantages, the entire weight of the dump body and load is carried principally by the frames and the connecting main pivot as the unit moves to dump position, thereby eliminating much of the load which in a conventional semi-trailer dump body is supported directly by the cylinder and piston unit.

Furthermore, where the rear axle assembly is a tandem wheel unit the rear of the main frame is preferably pivotally mounted upon the rear axle assembly so that the forward pair of tandem wheels may remain on the ground as the main frame and the dump body are moved to dump position.

The pivotal mounting between the main frame and the tandem rear axle assembly utilizes a rocker assembly which is pivoted on the axle assembly midway between the forward and rearward axles, and the main frame is pivoted on the rocker assembly just ahead of the rearward axle. When the main frame and dump body are in horizontal travel position their weight is transferred to the rear axle assembly through the rocker assembly pivot. As the main frame and dump body move toward dump position they first pivot with the rocker assembly until the latter rests on the rearward axle, after which they pivot on the rocker assembly. In this way the weight is properly balanced over the rear axle assembly for travel, while in dump position the rear of the body is well clear of the rearward wheels.

The rear of the dump body and main frame are stabilized to prevent undesirable side tilting in dump position by interengaging means on the rear of the main frame and the rear axle assembly which automatically interengage as the unit moves into dump position and automatically disengage as the unit moves away from dump position. The interengaging structure and mechanism are disclosed and claimed in my copending U.S. patent application Ser. No. 766,051, filed Oct. 9, 1968.

DESCRIPTION OF THE DRAWINGS

FIG. 1 is a side elevational view of a tractor to which is attached a tandem wheel semitrailer dump vehicle structure embodying the invention, the dump body being illustrated in horizontal or travel position;

FIG. 2 is a fragmentary horizontal section on an enlarged scale taken substantially as illustrated along the line 2—2 of FIG. 1;

FIG. 4 is a fragmentary transverse section on an enlarged scale taken substantially as indicated along the line 4—4 of FIG. 1;

FIG. 5 is a fragmentary broken sectional view on an enlarged scale taken substantially as indicated along the line 5—5 of FIG. 1, illustrating a preferred means for automatically stabilizing the dump body against sidewise tilting as it moves into dump position;

FIG. 6 is a fragmentary section taken substantially as illustrated along the line 6—6 of FIG. 2;

FIG. 7 is a side elevational view similar to FIG. 3, illustrating a modified structure in which the front wheels of a tandem rear axle assembly remain on the ground as the device moves to the dump position;

FIG. 9 is a fragmentary section taken substantially as indicated along the line 9—9 of FIG. 8;

FIG. 10 is a view similar to FIG. 8 showing the structure in dump position;

FIG. 11 is a fragmentary section, with parts omitted, taken substantially as illustrated along the line 11—11 of FIG. 12;

FIG. 12 is a fragmentary section taken substantially as indicated along the line 12—12 of FIG. 9, illustrating the pivotal support of the main frame on the rocker assembly, with parts omitted for clarity;

FIG. 13 is a fragmentary section taken substantially as indicated along the line 13—13 of FIG. 10; and FIG. 14 is a fragmentary section taken substantially as indicated along the line 14—14 of FIG. 13.

DETAILED DESCRIPTION OF THE INVENTION

Figure 3:
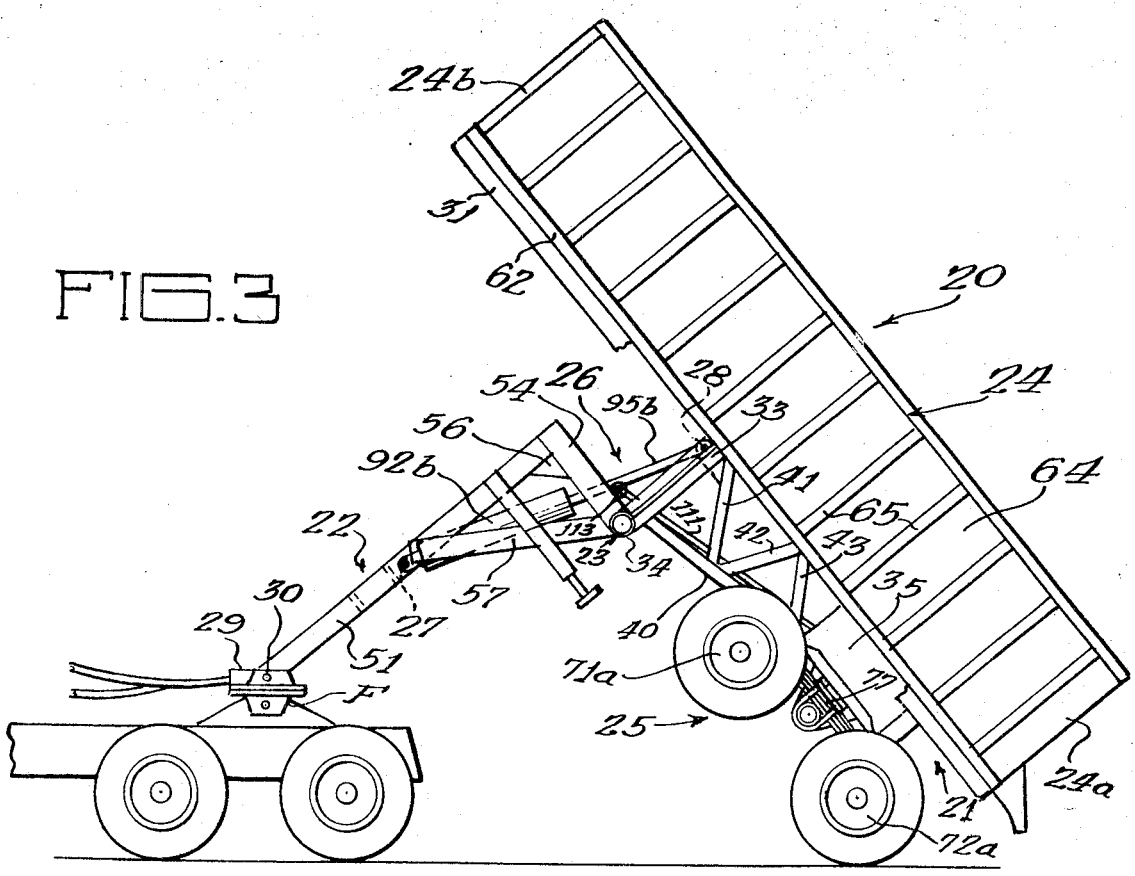
FIG. 3 is a view like FIG. 1 with the structure illustrated in dump position.

Referring to the drawings in detail, and referring first to FIGS. 1 and 3, the dump vehicle structure of the present invention, indicated generally at 20, can be drawn by a conventional tractor T provided with a standard fifth wheel F. The structure of the invention includes a longitudinal main frame, indicated generally at 21; a longitudinal forward frame, indicated generally at 22 and connected to the main frame 21 by main pivot means 23; a dump body 24 which is secured to the main frame 21 and has its forward end extending a substantial distance forward of the main frame in a horizontal, or travel position upon the forward frame 22; a rear axle assembly, indicated generally at 25, upon which the rear of the main frame 21 is supported; and extensible means, indicated generally at 26, consisting of a pair of identical hydraulic cylinder and piston units 26a and 26b which are pivoted to the forward frame at 27 and to the main frame at 28 across the main pivot 23. At the front end of the forward frame 22 is a conventional kingpin unit 29 which locks onto the fifth wheel F for rotary movement in the conventional manner and is provided with transverse pivot means 30 by means of which it is connected to said forward frame 22.

Figure 8:
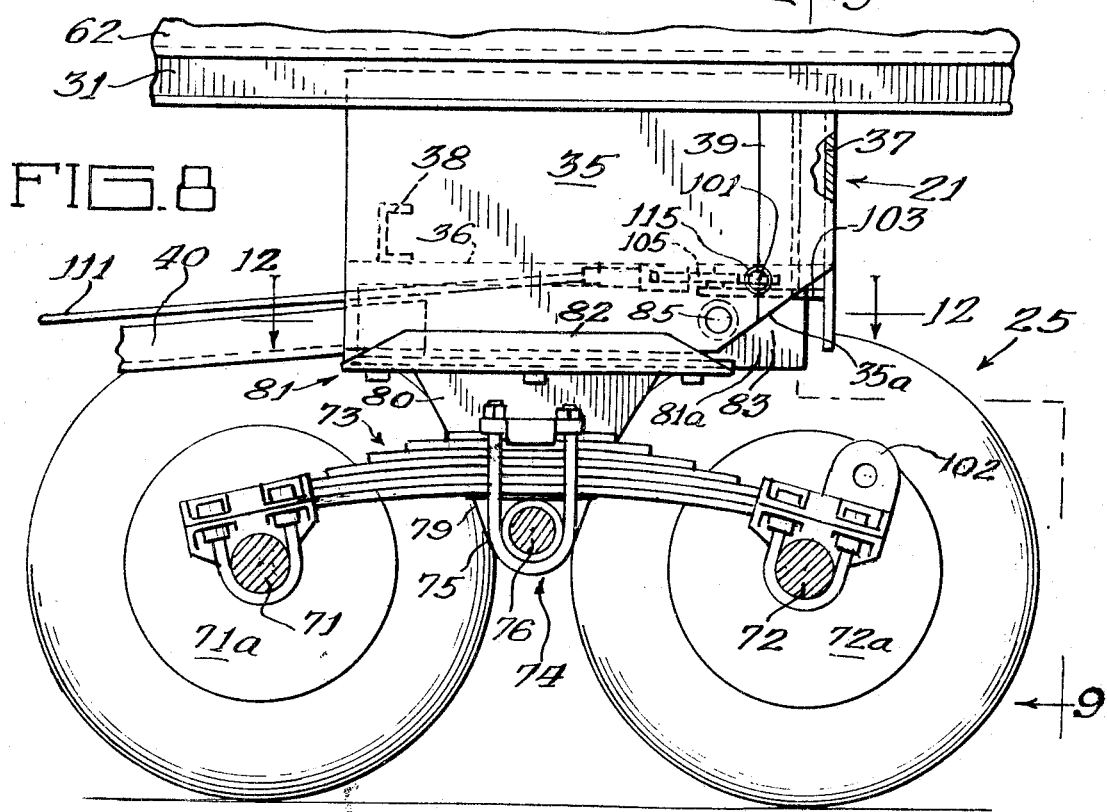
FIG. 8 is a fragmentary sectional view of the connection between the main frame and the tandem rear axle assembly of the modified form of the invention taken substantially as indicated along the line 8—8 of FIG. 9.

The main frame 21 is best seen in FIGS. 1, 2, 4, 6, 8 and 9. The main frame in FIGS. 8 and 9 differs from that in FIGS. 1 through 6 only in the fact that it is pivotally mounted on the tandem rear axle assembly 25 by a structure which will later be described in connection with the second form of the invention; so certain parts of the main frame structure which are best seen in FIGS. 8 and 9 are described at this time.

As best seen in FIGS. 2, 4 and 9 the main frame 21 includes a pair of parallel longitudinal channel beams 31 which extend from the rear end 24a of the dump body 24 and are connected adjacent their forward ends by a transverse box frame member 32. Immediately ahead of the box frame 32 a pair of channel arms 33 are welded to the longitudinal channel beams 31 perpendicular to the latter. At the lower ends of the arms 33, the forming part of the main pivot means 23, are hollow bosses 34 which support a transverse shaft 34a. In terms of the operation of the dump body structure, the main frame 21 ends at the arms 33, but the main channel beams 31 have integral extensions 31a (FIG. 2) which extend to the front 24b of the dump body 24 to support and strengthen the forward portion of the dump body.

As best seen in FIGS. 8 and 9, at the rear of the main frame 21 is a pair of side plates 35 the upper ends of which are welded to the main channel beams 31, the plates 35 being perpendicular to the channel beams and having integral channel portions 36 at their lower ends. The side plates 35 are connected at their rear ends by a deep cross channel member 37 and their forward end portions are connected by a cross channel 38 which is welded to the plates 35 and to the bottom channel portions 36. The side plates 35 have their lower rear corners cut off as indicated at 35a, and the rear ends of the side plates 35 are reinforced by gussets 39.

Extending forwardly from the lower ends of the side plates 35 to the lower ends of the perpendicular arms 33 are inclined braces 40, and diagonal braces 41, 42 and 43 connect the inclined braces 40 with the longitudinal channel beams 31.

The forward longitudinal frame 22 is best seen in FIGS. 2 and 4 to include a pair of parallel longitudinal beams 51 the front ends of which are bored to receive the pivot 30 which also impales flanges 29a of the kingpin unit 29 by means of which the forward frame 22 is connected to the fifth wheel F of the tractor T. Intermediate the ends of the forward frame 22 a transverse box frame 53 is welded to the longitudinal beams 51; and at the rear ends of the beams 51 are channel arms 54 which are welded to the beams and are perpendicular to them. A tube 55 which is part of the main pivot means 23 is journalled upon the shaft 34a and has its two ends welded to the arms 54 so as to provide a pivotal connection between the forward frame 22 and the main frame 21.

As best seen in FIG. 3, the longitudinal beams 51 of the forward frame and the arms 54 of that frame are reinforced by gusset plates 56 and diagonal braces 57, the latter of which connect the lower ends of the arms 54 to the beams 51. In addition, a cross brace 58 connects the arms 54 immediately above the tube 55, and a cross member 59 is welded to the arms 54 and to the longitudinal beams 51.

The dump body 24 is of conventional construction, having a floor 61 the longitudinal margins of which are reversely bent to provide sills 62, and at intervals cross braces 63 connect the sills to the longitudinal channel beams 31 of the main frame. In addition to the closed rear end 24a and the front end 24b, the dump body 24 includes parallel side walls 64 which are provided with upright braces 65 at intervals.

In addition to the cross braces 63, strengthening of the dump body floor 61 and stabilization of the entire dump body are provided by inclined braces 66 which connect the lower ends of the main frame perpendicular arms 33 to a pair of the cross braces 63 immediately adjacent the sills 62.

The structure of the tandem rear axle assembly 25 is generally conventional, and as best seen in FIGS. 8 and 9 it includes a forward axle 71 on which are journalled dual wheels 71a, a rearward axle 72 on which are journalled dual wheels 72a, leaf spring assemblies, indicated generally at 73, at the forward and rear ends of which the forward and rearward axles 71 and 72 are respectively mounted, and a central support assembly, indicated generally at 74. The central support assembly 74 includes U-bolts 75 by means of which a tubular cross arm 76 is suspended beneath the centers of the two leaf spring assemblies 73.

In the first form of the invention a pair of mounting pedestals 77 have hubs 78 by which they are journalled on the tubular cross arm 76, and a pair of mounting blocks 79 which surmount the pedestals 77 are bolted directly to the beams 31 of the main frame 21. As a result, as seen in FIG. 3 when the structure is moved to dump position the forward tandem wheels 71a of the axle assembly 25 are lifted clear of the ground. This can be undesirable in soft soil, where it may cause the rear tandem wheels 72a to sink into the ground during unloading of the unit.

To avoid this result, in the modified form of the invention which is illustrated in FIGS. 7 to 12 a pair of rocker members, indicated generally at 81, are interposed between the mounting blocks 79 and the beams 31. As best seen in FIGS. 8 to 11, the rocker members 81 include lower angles 82 and upper angles 83 which are bolted together facing in opposite directions, and as seen in FIG. 9 the channel-like lower ends 36 of the main frame side plates 35 are supported between the spaced upright arms of the oppositely facing angles 82 and 83. Welded between the angles 83 is a sleeve 84 which provides a journal for a shaft 85 the outer ends of which impale the two walls of the channel-like lower portion 36 of the main frame side plates 35 so as to pivotally support the main frame upon the rocker assembly 81. As best seen in FIG. 8, the shaft 85 is located a substantial distance to the rear of the tubular support arm 76, and only a short distance forward of a vertical plane through the rearward axle 72.

As a result of the just described alternative mounting arrangement for the rear of the main frame 21, when the dump vehicle structure is in the travel position of FIG. 1 the weight of the rear of the main frame and of the dump body is carried in properly balanced position between the tandem wheel sets of the rear axle assembly 25. During the first part of the movement of the dump body to dump position the rocker member 81 and the main frame 21 rock as a unit about the cross arm 76 until the rearwardly projecting rear end 81a of the rocker member 81 rests upon the rearward axle 72 as seen in FIGS. 10 and 11. Thereafter the main frame 21 and the dump body 24 pivot about the pivotal mounting 85 between the rocker member 81 and the main frame 21.

Referring now particularly to FIGS. 1, 2 and 3, the extensible means 26, consisting of the hydraulic cylinder and piston units 26a and 26b, is pivoted to the forward frame 22 at 27 and to the main frame 21 at 28. Describing this in more detail, the beams 51 are seen in FIG. 2 to be provided with bosses 90 which carry a transverse shaft 91. The cylinder and piston units 26a and 26b have their respective cylinders 92a and 92b toward the front of the dump trailer, and the front ends of the cylinders are provided, respectively, with hollow bosses 93a and 93b which are impaled by the transverse shaft 91 so as to pivotally mount the two cylinders on the forward frame 22. On the front of the box frame 32 of the main frame 21 are bosses 94a aligned with the cylinder 92a, and bosses 94b aligned with the cylinder 92b. The cylinder and piston units 26a and 26b have the rods of their respective pistons 95a and 95b provided with bearing collars 96a and 96b, respectively, which are journalled upon respective transverse pins 97a in the bosses 94a and 97b in the bosses 94b. Thus, the pistons 95a and 95b of the cylinder and piston units are pivotally connected to the main frame 21, and the units therefore provide extensible means which is pivotally connected to the main frame and to the forward frame across the main pivot 23.

Hydraulic connections 98a and 98b for the respective hydraulic cylinder and piston units 26a and 26b are arranged in a conventional fashion to extend the pistons 95a and 95b under hydraulic pressure exerted behind the pistons, or to retract said pistons by application of hydraulic pressure in front of them. The hydraulic supply hookups are conventional, and are connected by hydraulic pressure hoses 99 with valves and valve controls in the cab of the tractor T as is well known in the art.

When the extensible means 26 is retracted the dump vehicle structure 20 is in the travel position of FIG. 1, in which the entire forward portion of the dump body 24 is supported upon the means 51 of the forward frame 22. To elevate the dump body to dump position the hydraulic cylinder and piston units 26a and 26b are simultaneously extended which causes the dump body structure to move toward the position of FIG. 3 or FIG. 7, by causing the main frame arms 33 and the front frame arms 54 to pivot relative to one another about the main pivot 23 in a jackknife action which elevates the front of the dump body and moves it into dump position.

Locating the main transverse pivot 23 a substantial distance below the line of force of the extensible means 26 affords greater leverage for moving the dump body toward dump position than would be the case if the main pivot 23 were close to said line of force.

The present dump vehicle structure also includes means for laterally stabilizing the main frame and dump body in dump position which is disclosed and claimed in my copending application as heretofore stated. This is a very important factor because of the fact that large tandem wheel dump vehicle structures are very frequently used on construction sites where the ground may be uneven and contain soft spots, either of which may cause the two sides of the tandem rear axle assembly 25 to be at different levels. This gives the dump vehicle structure a relatively strong tendency to tilt toward the side which is on lower or softer ground. To prevent this, the rear of the main frame 21 and an unsprung portion of the rear axle assembly 25 are provided with an interlocking mechanism, indicated generally at 100, which is best seen in FIGS. 5, 8, 9, 13 and 14. The interlocking mechanism is so arranged that a pair of interlocking plungers 101 and 101a on the sides of the main frame and a pair of interlocking bosses 102 and 102a on the sides of the rear axle assembly 25 (see FIGS. 8 and 9) are automatically engaged as the main frame and dump body move into dump position. This is accomplished by a lever and linkage system, seen in FIG. 5, which will now be described.

A horizontal boss 103 on the forward face of the back channel 37 on the main frame 21 is provided with a pin 104 which is in a plane perpendicular to the plane of the coplanar dump body sills 62. Pivoted on the pin 104 is a lever 105 the rear end of which is pivotally connected at 106 to a push rod 107 which is connected to the interlocking plunger 101, and the front end of the lever 105 is pivotally connected at 108 to a push rod 107a which is connected to the plunger 101a, so that rotation of the lever 105 about the pin 104 moves both plungers lengthwise. Integral with the lever 105 is a short arm member 109 which is pivoted at 110 in a slot 111a of an operating rod 111 that extends forward and has a bifurcated forward end 112 which makes a pivotal connection 113 with a bracket 114 upon one of the perpendicular arms 54 of the forward frame 22.

The respective plungers 101 and 101a are slidably mounted in respective sleeves 115 and 115a which extend outwardly through the bracing webs 39 as seen in FIG. 9.

As seen in FIGS. 13 and 14, when the interlocking plungers 101 and 101a are extended their outer ends engage the openings in the hollow bosses 102 and 102a, respectively, so as to lock the dump body against transverse rocking movement either up or down with respect to the rear axle assembly 25. Extension of the plungers 101 and 101a occurs automatically as the dump body structure moves into dump position by the action of the lever 105 and operating linkage 109–111. The jackknifing action of the main frame 21 and forward frame 22 pulls the operating rod 111 toward the front, and the slot 111a provides a lost motion connection which causes the lever 105 to pivot clockwise as seen in FIG. 5 and extend the plungers 101 and 101a until, when the dump body reaches a predetermined position, the plungers impale the openings in the respective hollow bosses 102 and 102a. The opposite action of the operating rod 111 and lever 105 as the dump body returns toward travel position retracts the plungers 101 and 101a and disengages them from the hollow bosses 102 and 102a.

The foregoing detailed description is given for clearness of understanding only and no unnecessary limitations should be understood therefrom as modifications will be obvious to those skilled in the art.

I claim:

1. In a semitrailer dump vehicle structure for use with a tractor having a fifth wheel, in combination: a longitudinal main frame; a rear axle assembly including an unsprung portion comprising an axle and wheels, and springs on said portion which support the rear of said main frame; a dump body provided with generally coplanar longitudinal sills and supported on said main frame, said body having its forward portion extending a substantial distance forwardly of the front of the main frame; a longitudinal forward frame which supports the forward portion of the dump body in a horizontal travel position of the latter; means including a front transverse pivot for detachably mounting the front of the forward frame on a fifth wheel of a tractor; a main transverse pivot connecting the front end of the main frame and the rear end of the forward frame; and extensible means pivotally connected to both said frames across said main pivot so that extension of said means elevates the adjacent ends of the frames and jackknifes them about the main pivot to move the dump body to an inclined dump position.

2. The structure of claim 1 in which the main frame and the forward frame include integral depending arms which are transversely aligned in the horizontal position of the dump body, in which the main pivot extends through the lower ends of said arms, and in which the extensible means is generally parallel to the bottom of the dump body in said horizontal position and above said pivot.

3. The structure of claim 2 in which the main frame and the forward frame each includes parallel longitudinal beams on which the dump body rests in its horizontal position, and in which the extensible means is positioned between said beams.

4. The structure of claim 1 in which the main pivot is positioned close to the transverse median plane of the body.

5. The structure of claim 1 in which the rear axle assembly includes a forward axle and a rearward axle supporting tandem wheels, and which includes means pivotally mounting the rear of the main frame on said wheel assembly so that the wheels on the forward axle may remain on the ground as the main frame moves into dump position.

6. The structure of claim 5 in which the pivotal mounting means includes a first transverse shaft on the axle assembly between the tandem axles, a rocker assembly journalled on said transverse shaft, a second transverse shaft toward the rear of the rocker assembly, and means journalling the rear of the main frame on said second transverse shaft.

7. The structure of claim 6 in which the relationship between the main frame, the rocker assembly and the rearward axle is such that the main frame and the rocker assembly pivot as a unit about the first transverse shaft during the first part of movement toward dump position, the rear of the rocker assembly bears upon the rearward axle at a predetermined point in said movement, and that during a second part of said movement the main frame pivots about the second transverse shaft.

References Cited

UNITED STATES PATENTS

| 2,661,236 | 12/1953 | Schonrock | 298—20 |
| 2,794,673 | 6/1957 | Harbers | 298—22 |
| 2,832,486 | 4/1958 | Clark. | |
| 3,030,150 | 4/1962 | Lorenz | 298—22 |

RICHARD J. JOHNSON, Primary Examiner